United States Patent
Murai et al.

(10) Patent No.: US 8,436,798 B2
(45) Date of Patent: May 7, 2013

(54) METHOD FOR DRIVING ELECTRO-OPTIC DEVICE, ELECTRO-OPTIC DEVICE, AND ELECTRONIC APPARATUS

(75) Inventors: Hidetoshi Murai, Yokohama (JP); Tomoaki Sekime, Shiojiri (JP); Hayato Kurasawa, Matsumoto (JP); Jin Ota, Ichinomiya (JP)

(73) Assignee: Sony Corporation, Tokyo (JP)

( * ) Notice: Subject to any disclaimer, the term of this patent is extended or adjusted under 35 U.S.C. 154(b) by 709 days.

(21) Appl. No.: 12/000,426

(22) Filed: Dec. 12, 2007

(65) Prior Publication Data

US 2008/0218462 A1    Sep. 11, 2008

(30) Foreign Application Priority Data

Mar. 7, 2007 (JP) .................................. 2007-056933

(51) Int. Cl.
*G09G 3/36* (2006.01)

(52) U.S. Cl.
USPC ............................................ 345/89; 345/690

(58) Field of Classification Search .................... 345/87, 345/89, 98–103, 204, 690
See application file for complete search history.

(56) References Cited

U.S. PATENT DOCUMENTS

| 6,040,814 A * | 3/2000 | Murakami et al. ............. 345/94 |
| 6,864,868 B2 * | 3/2005 | Kawano ......................... 345/87 |
| 2004/0223096 A1 * | 11/2004 | Ochiai et al. .................. 349/107 |
| 2006/0012554 A1 * | 1/2006 | Saishu et al. .................... 345/97 |
| 2007/0002226 A1 * | 1/2007 | Sakamoto et al. ............ 349/114 |

FOREIGN PATENT DOCUMENTS

JP    A-2004-309520    11/2004

* cited by examiner

*Primary Examiner* — Chanh Nguyen
*Assistant Examiner* — Pegeman Karimi
(74) *Attorney, Agent, or Firm* — K&L Gates, LLP

(57) ABSTRACT

A method for driving an electro-optic device includes a first and second electrode and a pair of substrates sandwiching an electro-optic layer driven by the first electrode. The method involves shifting one of two potentials input to at least one of the electrodes such that a potential difference between the first and second electrode where the potential input to the first electrode is higher than the potential input to the second electrode is larger than a potential difference between the first and second electrode where the potential input to the first electrode is lower than the potential input to the second electrode, when a gray-scale level where potential input to the first electrode is higher than potential input to the second electrode is equivalent to the gray-scale level where potential input to the first electrode is lower than potential input to the second electrode.

9 Claims, 6 Drawing Sheets

METHOD FOR DRIVING ELECTRO-OPTIC DEVICE, ELECTRO-OPTIC DEVICE, AND ELECTRONIC APPARATUS

CROSS-REFERENCE TO RELATED APPLICATION

This application claims priority to Japanese Patent Application No. 2007-056933, filed in Japan on Mar. 7, 2007; the entire disclosure of which is expressly incorporated by reference.

BACKGROUND

1. Technical Field

The present invention relates to a method for driving an electro-optic device, an electro-optic device, and an electronic apparatus.

2. Related Art

A mode in which the alignment of liquid crystal molecules is controlled in response to electric fields in the direction of a substrate that is generated across a liquid crystal layer (electro-optic layer) (hereinafter referred to as a "transverse electric field mode") has been used to realize liquid crystal display devices (electro-optic devices) with a wide viewing angle. An in-plane switching (IPS) mode and a fringe-field switching (FFS) mode are known as such transverse electric field modes.

A typical liquid crystal display device using the transverse electric field mode has a disadvantage in that electric charges tend to more easily remain compared with a liquid crystal display device using a twisted nematic (TN) mode in the related art because of the asymmetry in the electrode configuration, resulting in the occurrence of image sticking. There is a method for shifting the average of potentials with positive polarity and potentials with negative polarity of pixel electrodes for each gray scale in a liquid crystal display device using the IPS mode to prevent image sticking (see, for example, the method disclosed in JP-A-2004-309520).

A liquid crystal display device using the FFS mode also has the disadvantage in that image sticking occurs, and a solution that can prevent the disadvantage is necessary. However, the above-mentioned method in the related art has a problem. That is, the shapes of electrodes in a liquid crystal display device using the FFS mode are different from those of electrodes in a liquid crystal display device using the IPS mode. Accordingly, when the method developed for a liquid crystal display device using the IPS mode is applied to a liquid crystal display device using the FFS mode, it is difficult to effectively suppress the accumulation of electric charges, and unfortunately, image sticking still occurs.

SUMMARY

An advantage of some aspects of the invention is that a method for driving an electro-optic device, an electro-optic device, and an electronic apparatus, which can suppress image sticking in a liquid crystal display device using the FFS mode, can be provided.

According to a first aspect of the invention, there is provided a method for diving an electro-optic device including a pair of substrates that sandwich an electro-optic layer, and first and second electrodes that are disposed on one of the pair of substrates. The first electrode is used to drive the electro-optic layer, and the second electrode being disposed closer to the electro-optic layer than the first electrode. The method involves shifting one of signal potentials each of which is input to at least one of the first and second electrodes such that the potential difference between the first and second electrodes in a case where the signal potential input to the first electrode is higher than the signal potential input to the second electrode is larger than the potential difference between the first and second electrodes in a case where the signal potential input to the first electrode is lower than the signal potential input to the second electrode, when a gray-scale level defined by white luminance in the case where the signal potential input to the first electrode is higher than the signal potential input to the second electrode is equivalent to the gray-scale level in the case where the signal potential input to the first electrode is lower than the signal potential input to the second electrode.

When the electro-optic device is, for example, a liquid crystal display device using the FFS mode in which a liquid crystal layer is driven by electric fields generated between the first and second electrodes, electric charges tend to be easily accumulated in a panel because of the asymmetrical shapes of electrodes, which is distinctive in the FFS mode configuration. The accumulated electric charges may lead to a problem such as image sticking in the liquid crystal layer. In the first aspect of the invention, as described above, by shifting the signal potential, the electric field from the first electrode to the second electrode can be more intensified than the electric field from the second electrode to the first electrode. This enables the accumulation of electric charges in the panel to be suppressed, resulting in the prevention of the image sticking in the liquid crystal layer.

In the method for driving an electro-optic device, it is preferable that the signal potential be shifted over an entire range of a plurality of gray-scale levels.

This enables the above-described image sticking in the liquid crystal layer to be prevented over the entire range of gray-scale levels. Thus, the display quality of the electro-optic device can be improved, and the performance of the electro-optic device can be improved.

In the method for driving an electro-optic device, it is further preferable that the signal potential be shifted around a value corresponding to a maximum gray-scale level.

Since the signal potential is shifted around the value corresponding to a maximum gray-scale level, this enables the increase of power consumption due to the shifting of the signal potential to be suppressed. Additionally, the accumulation of electric charges in the case where the maximum gray-scale level is set, which more easily cause the image sticking, can be reliably suppressed.

In the method for driving an electro-optic device, it is further preferable that a shift amount of the signal potential be gradually increased on the basis of the increase of the gray-scale level.

This gradually increases the shift amount of the signal potential as electric charges become to be easily accumulated because the amount of accumulated electric charges is increased as the gray-scale level is raised. Accordingly the accumulation of electric charges can be suppressed, and the occurrence of image sticking can be prevented.

According to a second aspect of the invention, there is provided an electro-optic device including a pair of substrates, first and second electrodes, and a control unit. The pair of substrates sandwich an electro-optic layer. The first and second electrodes are disposed on one of the pair of substrates. The first electrode is used to drive the electro-optic layer, and the second electrode is disposed closer to the electro-optic layer than the first electrode. The control unit shifts one of signal potentials each of which is input to at least one of the first and second electrodes such that the potential difference between the first and second electrodes in a case where the signal potential input to the first electrode is higher than the signal potential input to the second electrode is larger than the potential difference between the first and second electrodes in a case where the signal potential input to the first electrode is lower than the signal potential input to the second electrode, when a gray-scale level defined by white luminance in the case where the signal potential input to the first electrode is higher than the signal potential input to the second electrode is equivalent to the gray-scale level in the case where the signal potential input to the first electrode is lower than the signal potential input to the second electrode.

When the electro-optic device is, for example, a liquid crystal display device using the FFS mode in which a liquid crystal layer is driven by electric fields generated between the first and second electrodes, as described above, by shifting the signal potential, the electric field from the first electrode to the second electrode can be more intensified than the electric field from the second electrode to the first electrode. Accordingly, the accumulation of electric charges due to the asymmetrical shapes of the electrodes, which is distinctive in the FFS mode configuration, can be suppressed, and the problem such as image sticking in the liquid crystal layer can be prevented.

In the electro-optic device, it is preferable that the signal potential be shifted over an entire range of a plurality of gray-scale levels.

With this configuration, the above-described image sticking in the liquid crystal layer can be prevented over the entire range of gray-scale levels. Thus, the display quality of the electro-optic device can be improved, and the performance of the electro-optic device can be improved.

In the electro-optic device, it is further preferable that the signal potential be shifted around a value corresponding to a maximum gray-scale level.

With this configuration, since the signal potential is shifted only around the value corresponding to a maximum gray-scale level, the increase of power consumption due to the shifting of the signal potential can be suppressed. Additionally, the accumulation of electric charges in the case where the maximum gray-scale level is set, which more easily cause the image sticking, can be reliably suppressed.

In the electro-optic device, it is further preferable that a shift amount of the signal potential be gradually increased on the basis of the increase of the gray-scale level.

With this configuration, the shift amount of the signal potential is gradually increased on the basis of the increase of the gray-scale level that causes the increase of the amount of electric charges to be accumulated. This enables the accumulation of electric charges to be reliably suppressed, resulting in the prevention of the image sticking.

An electronic apparatus according to a third aspect of the invention includes the electro-optic device.

Since the electronic apparatus according the third aspect of the invention includes the electro-optic device capable of preventing the image sticking, the display quality of the electronic apparatus can be improved, and the performance of the electronic apparatus can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
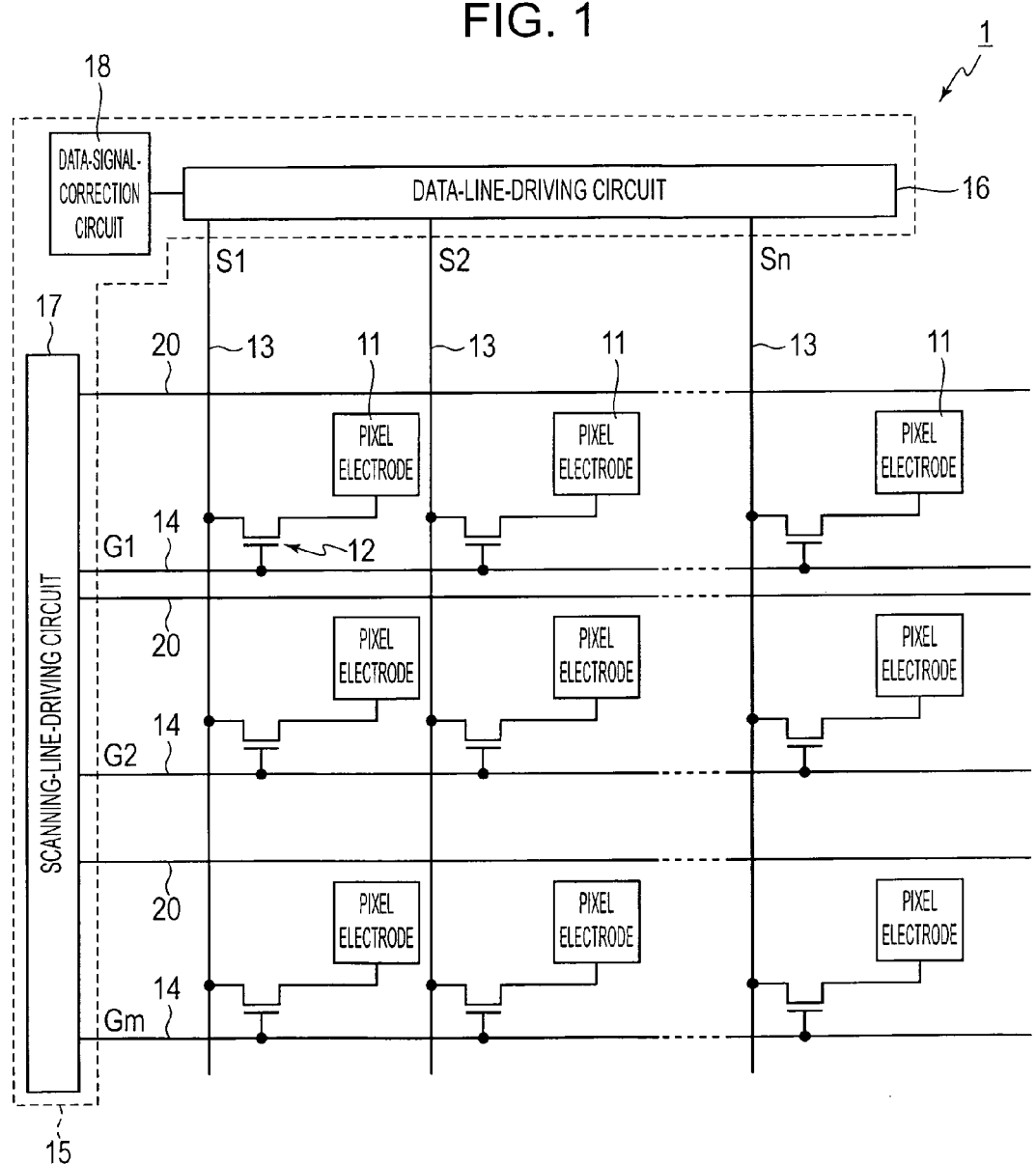
FIG. 1 is a diagram showing an equivalent circuit of a liquid crystal display device.
Figure 2:
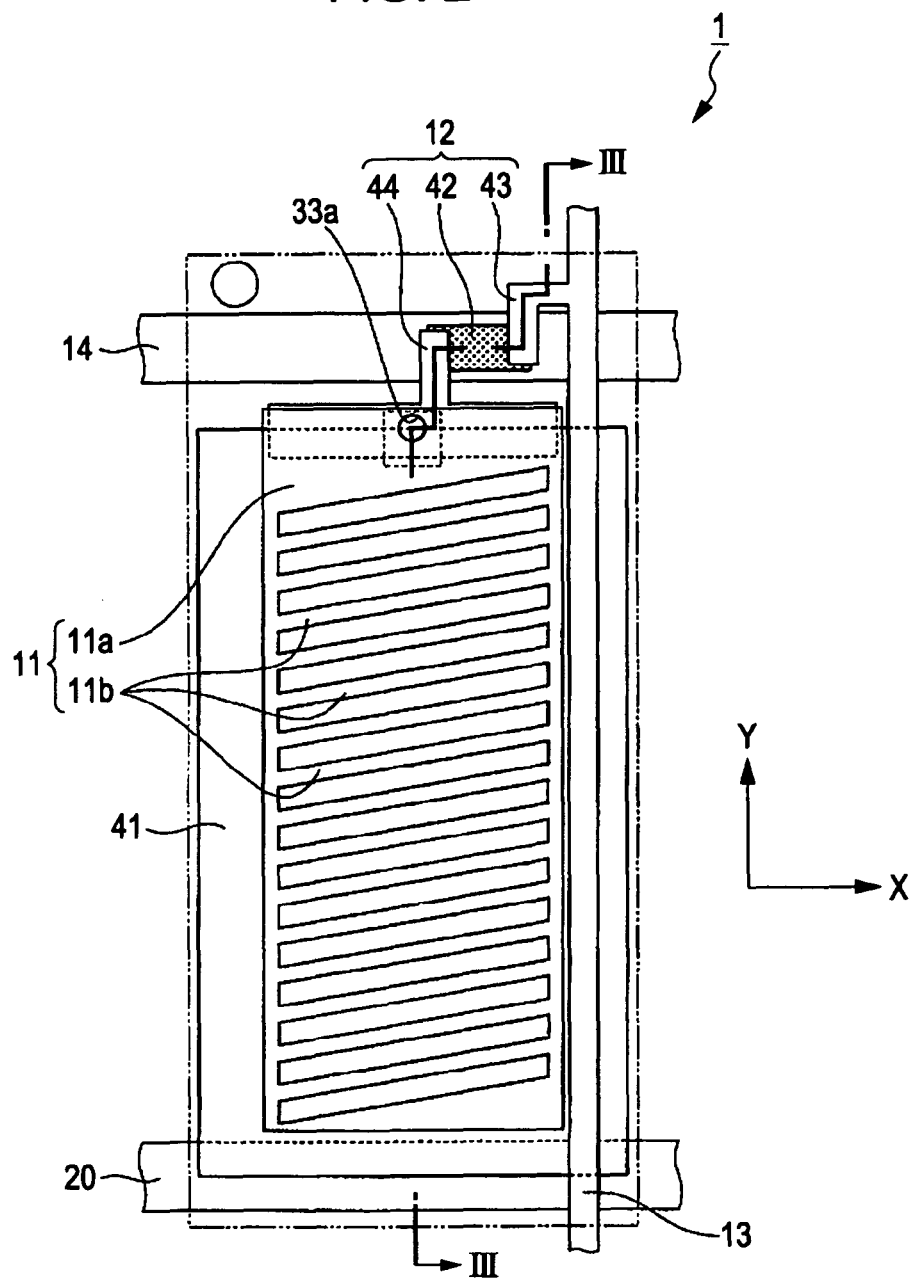
FIG. 2 is a partially enlarged structural plan view of a sub-pixel region of the liquid crystal display device.
Figure 3:
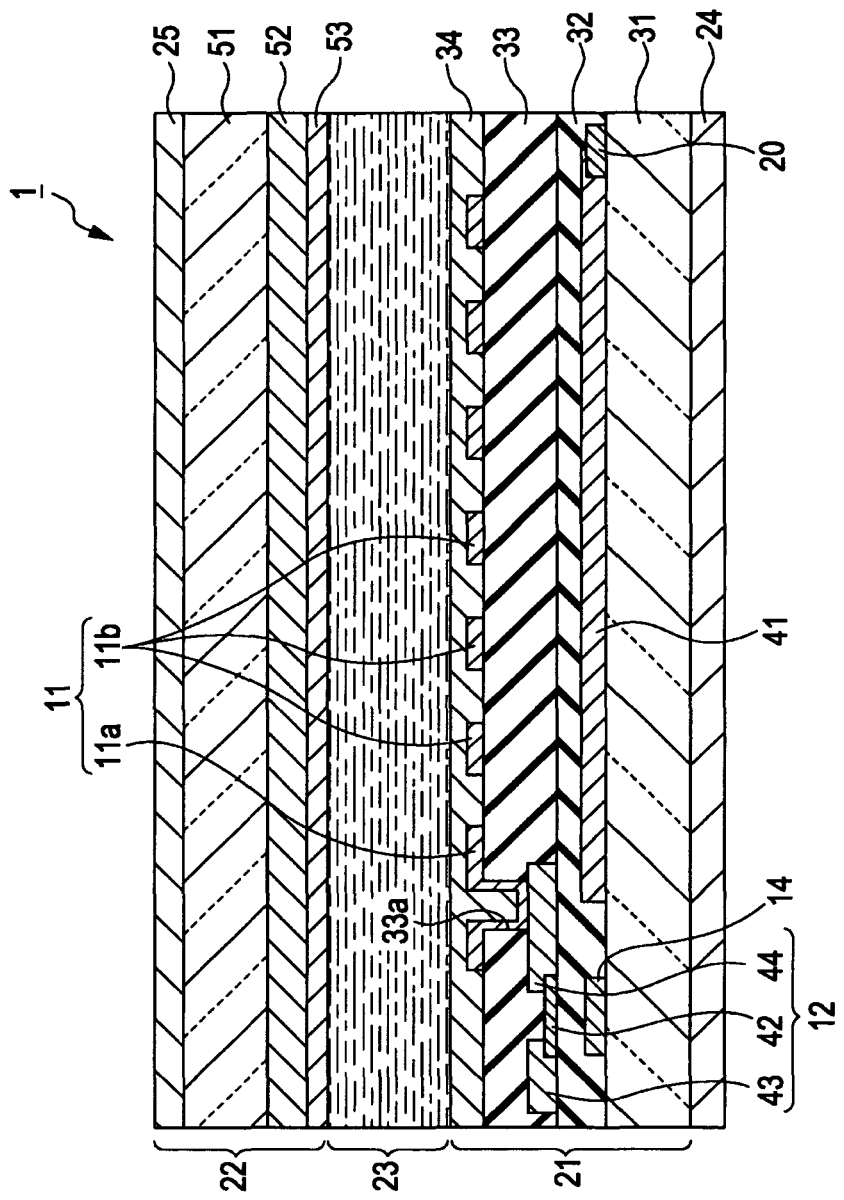
FIG. 3 is a cross-sectional view of the liquid crystal display device shown in FIG. 2, taken along the line III-III.
Figure 4:
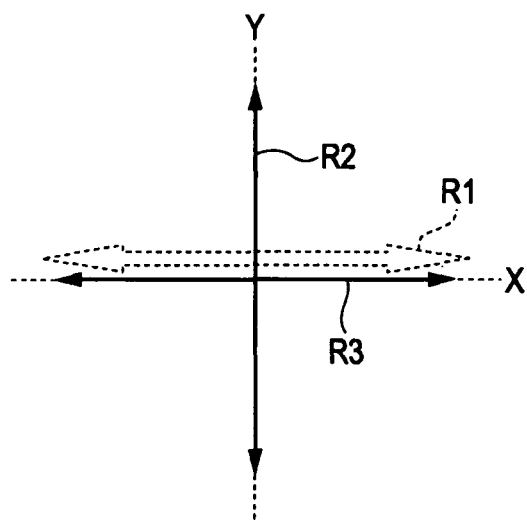
FIG. 4 is a graph showing an optic-axis arrangement of the liquid crystal display device.

An embodiment of an electro-optic device according to the invention will be described with reference to the accompanying drawings. In the drawings used in the description below, the scale used for each element is appropriately varied so that the element is of a recognizable size. In the embodiment, a liquid crystal display device using the FFS mode is described as an example of the electro-optic device. FIG. 1 is a diagram showing an equivalent circuit of the liquid crystal display device. FIG. 2 is a partially enlarged structural plan view of a sub-pixel region of the liquid crystal display device. FIG. 3 is a cross-sectional view of the liquid crystal display device shown in FIG. 2, taken along the line III-III. FIG. 4 is a graph showing an optic-axis arrangement of the liquid crystal display device shown in FIG. 2.

Liquid Crystal Display Device

A liquid crystal display device 1 according to the embodiment of the invention is a color liquid crystal display device using the FFS mode, and includes a pixel having three sub-pixel regions each of which outputs red (R), green (G), or blue (B) light. Here, a display region that is the minimum unit of a display configuration is referred to as the "sub-pixel region", and a display region including a set of R, G, B sub-pixel regions is referred to as a "pixel display region".

First, the schematic configuration of the liquid crystal display device 1 will be described. As shown in FIG. 1, sub-pixel regions, with which the pixel display region is configured, are arranged in a matrix in the liquid crystal display device 1.

Each of the sub-pixel regions, with which the pixel display region of the liquid crystal display device 1 is configured, one of pixel electrodes (second electrodes) 11 and a corresponding one of thin film transistor (TFT) elements 12, each of which controls switching operation of a respective pixel electrode 11, are formed. The source of the TFT element 12 is connected to a corresponding one of data lines 13 extending from a data-line-driving circuit (liquid-crystal-driving unit) 16 that is provided in the liquid crystal display device 1 and described below. The gate of the TFT element 12 is connected to a corresponding one of scanning lines 14 extending from a scanning-line-driving circuit 17 that is provided in the liquid crystal display device 1 and described below. The drain of the TFT element 12 is connected to the pixel electrode 11.

As shown in FIG. 2, the data lines 13 extend in the Y direction, and the scanning lines 14 and common lines 20 extend in the X direction. Since a counter substrate is not shown in FIG. 2, the data lines 13, the scanning lines 14, and the common lines 20 are arranged substantially in a grid pattern in plan view.

Each of semiconductor layers 42 is composed of a semiconductor, such as amorphous silicon, formed in a region in which the semiconductor layer 42 overlaps with a corresponding one of the scanning lines 14 in plan view. As shown in FIG. 2, each of source electrodes 43 is formed as a wiring pattern that is substantially inverse L-shaped in plan view, and the source electrode 43 is connected to the semiconductor layer 42 as a wiring pattern diverging from a corresponding one of the data lines 13. Each of drain electrodes 44 is electrically connected through a corresponding one of contact holes 33a, which pass through an interlayer insulator film 33, to a corresponding one of the pixel electrodes 11, and the connection is located on one end of the sub-pixel region in the Y direction shown in FIG. 2. Accordingly, the TFT element 12 includes the semiconductor layer 42, the source electrode 43, and the drain electrode 44. Therefore, the TFT element 12 is disposed in the vicinity of the intersection between the data line 13 and the scanning line 14.

Each of common electrodes (first electrodes) 41 corresponds to a respective sub-pixel region, and is substantially rectangular shaped in plan view. Additionally, the common electrode 41 is formed in a region in which the common electrode 41 covers a corresponding one of the pixel electrodes 11, each of which includes a plurality of strip electrodes 11b, and spaces among the strip electrodes 11b. Each of the common lines 20 overlaps with an end of the common electrode 41, which is disposed in correspondence with the respective sub-pixel region, in plan view to be electrically connected to the common electrode 41. A common potential is supplied through the common lines 20 to the common electrodes 41.

The pixel electrodes 11 are substantially ladder shaped in plan view and composed of a light-transmissive conductive material such as indium tin oxide (ITO). The thickness of films included in the pixel electrodes 11 is less than or equal to 50 nm. Each of the pixel electrodes 11 includes a corresponding one of frames 11a having a rectangular shape in plan view and the (fifteen) strip electrodes 11b that extend substantially in the X direction and are arranged with spaces thereamong in the Y direction. Ends of each of the strip electrodes 11b are connected to portions of the frame 11a that extend in the Y direction.

The common electrodes 41 have a strip shape extending in the X direction shown in FIG. 2 in plan view, and are composed of a light-transmissive conductive material, such as ITO, as in the case of the pixel electrodes 11. The common electrodes 41 are arranged more apart from a liquid crystal layer 23 than the pixel electrodes 11. That is, the common electrodes 41 are formed on a layer lower than a layer including the pixel electrodes 11.

Accordingly, the pixel electrodes 11 and the common electrodes 41 sandwich a gate insulator film 32 including an insulator layer, and an interlayer insulator film 33. Thus, the pixel electrodes 11 and the common electrodes 41 have an electrode configuration for the FFS mode.

As shown in FIG. 1, the liquid crystal display device 1 includes the data-line-driving circuit 16, which supplies image signals S1, S2, . . . , Sn through the data lines 13 to the sub-pixel regions, the scanning-line-driving circuit 17, which supplies scanning signals G1, G2, . . . , Gm through the scanning lines 14 to the sub-pixel regions, and a data-signal-correction circuit (control unit) 18 having connections with the data-line-driving circuit 16.

When a gray-scale level defined by white luminance in a case where a signal potential input to the common electrodes 41 is higher than a signal potential input to the pixel electrodes 11 is equivalent to the gray-scale level in a case where the signal potential input to the common electrodes 41 is lower than the signal potential input to the pixel electrodes 11, the data-signal-correction circuit 18 shifts the signal potential input to the pixel electrodes 11 such that the potential differences between the common electrodes 41 and the pixel electrodes 11 in the case where the signal potential input to the common electrodes 41 is higher than the signal potential input to the pixel electrodes 11 are larger than the potential differences between the common electrodes 41 and the pixel electrodes 11 in the case where the signal potential input to the common electrodes 41 is lower than the signal potential input to the pixel electrodes 11. With this configuration, image sticking in a liquid crystal layer can be prevented as described below.

The data-line-driving circuit 16 may line-sequentially supply the image signals S1 to Sn in the order of 1 to n, or alternatively, may supply the image signals S1 to Sn in units of groups of some of the data lines 13 adjacent to one another. The scanning-line-driving circuit 17 line-sequentially supplies the scanning signals G1 to Gm as pulses at a predetermined timing.

Although the details will be described below, basically the data-signal-correction circuit 18 shifts (corrects) data signals (signal potentials) with respect to the common potential and supplies the shifted data signals to the data-line-driving circuit 16.

In the liquid crystal display device 1, the scanning signals G1 to Gm are input to turn on the TFT elements 12, which serve as switching elements, during a certain period, and the corrected data signals, which are corrected by the data-signal-correction circuit 18 as described above, are input as the image signals S1 to Sn through the data lines 13 to the pixel electrodes 11 at a predetermined timing. The image signals S1 to Sn having predetermined levels, which are input to liquid crystal through the pixel electrodes 11, are stored for a certain period between the pixel electrodes 11 and the common electrodes 41.

Since the liquid crystal display device 1 according to the embodiment uses the FFS mode as described above, the liquid crystal display device 1 displays data in a normally-black mode. That is, the alignment of liquid crystal molecules are controlled in response to voltages applied between the pixel electrodes 11 and the common electrodes 41 to display white.

Generally, in order to prevent the degradation of liquid crystal in liquid crystal display devices, the polarity of pixel potentials with respect to a common potential is inverted on a frame-by-frame basis. That is, the polarity of pixel potentials with respect to a common potential is inverted every period (frame) when it is necessary to sequentially select all scanning lines. The common potential is set such that the absolute value of a voltage applied across liquid crystal in a first frame and the absolute value of a voltage applied across the liquid crystal in a second frame, in which the polarity of pixel potentials set in the first frame is inverted, are equal, as the same gray-scale level. Accordingly, voltages applied across a liquid crystal layer are defined using the potential differences between signal potentials input to the pixel electrodes and the common potential.

It is desirable that the inversion of the polarity of pixel potentials can prevent the degradation of liquid crystal also in liquid crystal display devices using the FFS mode. However, in this case, the common potential is changed as voltages applied between the pixel electrodes and common electrodes are increased. Here, when a gray-scale level is defined by white luminance, since the liquid crystal display devices using the FFS mode display data in the normally-black mode, the amount of the change of the common potential is increased as the gray-scale level is increased.

The present inventors had a knowledge that since the shapes of electrodes are asymmetrical, which is distinctive in the FFS mode configuration, electric charges tend to remain in an interlayer insulator film, so that the electric charges influence the above-described change of the common potential.

As a result of the intensive research, the present inventors found that in a liquid crystal display device with the configuration for the FFS mode, when the average of potentials input to lower electrodes (first electrodes) is set to be larger than the average of potentials input to upper electrodes (second electrodes), electric fields from the first electrodes to the second electrodes can be more intensified than electric fields from the second electrodes to the first electrodes. This enables the above-described tendency of electric charges to remain to be suppressed. Therefore, the liquid crystal display device 1 that can prevent the image sticking in a liquid crystal layer can be provided.

That is, referring to FIG. 1, in the liquid crystal display device 1 according to the embodiment, the data-signal-correction circuit 18 supplies the data signals to the data-line-driving circuit 16 such that the average of potentials applied to the common electrodes (first electrodes) 41 is larger than the average of potentials applied to the pixel electrodes (second electrodes) 11.

Next, the cross-sectional configuration of the liquid crystal display device 1 will be described with reference to FIG. 3. Some of the strip electrodes 11b included in one of the pixel electrodes 11 are appropriately omitted in FIG. 3.

As shown in FIG. 3, the liquid crystal display device 1 includes an element substrate 21, a counter substrate 22 disposed to face the element substrate 21, the liquid crystal layer 23 sandwiched between the element substrate 21 and the counter substrate 22, and a polarization sheet 24 disposed on the outer surface, which is on the side opposite that of the liquid crystal layer 23, of the element substrate 21, and a polarization sheet 25 disposed on the outer surface of the counter substrate 22. In the liquid crystal display device 1, illuminating light enters from the outer surface side of the element substrate 21.

Additionally, in the liquid crystal display device 1, a sealing material (not shown in any drawings) is disposed along the edge of a region in which the element substrate 21 and the counter substrate 22 face each other, and the liquid crystal layer 23 is sealed together with the sealing material, the element substrate 21, and the counter substrate 22.

The element substrate 21 includes a substrate body 31 composed of a light-transmissive material such as glass, quartz, or plastic, the gate insulator film 32, the interlayer insulator film 33, and an alignment film 34, which are stacked in this order on the inner surface of the substrate body 31 (the side of the liquid crystal layer 23).

The element substrate 21 includes the scanning lines 14, the common electrodes 41, and the common lines 20, which are disposed on the inner surface of the substrate body 31. The common electrodes 41 each correspond to one of the sub-pixel regions, and the common lines 20 allowing the common electrodes 41 to be connected to one another. The element substrate 21 also includes the data lines 13 (shown in FIG. 2), the semiconductor layers 42, the source electrodes 43, the drain electrodes 44, which are disposed on the inner surface of the gate insulator film 32, and the pixel electrodes 11 disposed on the inner surface of the interlayer insulator film 33. The gate insulator film 32 is composed of an insulative light-transmissive material, such as silicon nitride or silicon oxide, and covers the scanning lines 14, the common lines 20, and the common electrodes 41, which are formed on the substrate body 31.

As in the case of the gate insulator film 32, the interlayer insulator film 33 is composed of an insulative light-transmissive material, such as silicon nitride or silicon oxide, and covers the semiconductor layers 42, the source electrodes 43, and the drain electrodes 44, which are formed on the gate insulator film 32. The contact holes 33a, each of which allows a corresponding one of the pixel electrodes 11 and a corresponding one of the TFT elements 12 to be electrically connected to each other, are formed in portions of the interlayer insulator film 33 overlapping with the frames 11a, which are described below, of the pixel electrode 11 in plan view.

The alignment film 34 is composed of an organic material such as polyimide, and covers the pixel electrodes 11 formed on the interlayer insulator film 33. Additionally, an alignment used to control liquid crystal molecules included in the liquid crystal layer 23 is provided on the surface of the alignment film 34. As the direction indicated by the arrow R1 in FIG. 4 shows, this alignment on the alignment film 34 is provided in the same direction as the X direction.

As shown in FIG. 3, the counter substrate 22 includes a substrate body 51 composed of a light-transmissive material such as glass, quartz, or plastic, color filter layers 52, and an alignment film 53, which are stacked in this order on the inner surface of the substrate body 51 (the side of the liquid crystal layer 23).

The color filter layers 52 are disposed in correspondence with the sub-pixel regions and composed of, for example, an acrylic material. That is, each of the color filter layers 52 includes a corresponding one of color materials each of which is used to display a color in a respective sub-pixel region.

The alignment film 53 is composed of an organic material, such as polyimide, or an inorganic material, such as silicon oxide, and the alignment of the alignment film 53 is provided in the same direction as the alignment of the alignment film 34.

The polarization sheets 24 and 25 are provided such that the transmissive axes thereof are orthogonal to each other. That is, the transmissive axis of the polarization sheet 24 is provided in the Y direction as the direction indicated the arrow R2 in FIG. 4 shows, and the transmissive axis of the polarization sheet 25 is provided in the X direction orthogonal to the transmissive axis of the polarization sheet 24 as the direction indicated by the arrow R3 in FIG. 4 shows.

Method for Driving Liquid Crystal Display Device

Next, a method for driving the liquid crystal display device 1 with the above-described configuration will be described as an embodiment of a method for driving a liquid crystal display device according to the invention. The liquid crystal display device 1 according the embodiment of the invention is a liquid crystal display device using the FFS mode, which is a transverse electric field mode. In the liquid crystal device 1, image signals (voltages) are supplied through the TFT elements 12 to the pixel electrodes 11 to generate electric fields between the pixel electrodes 11 and the common electrodes 41 in the direction of the surfaces of the substrates. These electric fields drive liquid crystal. Display operation is performed in the liquid crystal display device 1 by changing the transmittance of liquid crystal in units of sub-pixel regions.

That is, in a state in which no voltage is applied to the pixel electrodes 11, liquid crystal molecules included in the liquid crystal layer 23 are horizontally aligned in the direction indicated by the arrow R1 in FIG. 4. When electric fields orthogonal to the direction in which the strip electrodes 11b of the pixel electrodes 11 extend are generated in the liquid crystal layer 23 through the pixel electrodes 11 and the common electrodes 41, the liquid crystal modules are aligned in this direction of the electric fields.

In the liquid crystal display device 1, illuminating light travels through the polarization sheet 24 to be converted to linear-polarized light traveling along the transmissive axis of the polarization sheet 24, and then the linear-polarized light enters the liquid crystal layer 23.

When the liquid crystal layer 23 is in an off state (non-selected state), the linear-polarized light, which enters the liquid crystal layer 23, emits from the liquid crystal layer 23 in the same polarization state as in which the linear-polarized light enters the liquid crystal layer 23. The linear-polarized light is absorbed in the polarization sheet 25 having the transmissive axis orthogonal to the direction of the linear-polarized light to display dark in the sub-pixel regions.

In contrast, when the liquid crystal layer 23 is in an on state (selected state), the liquid crystal layer 23 allows a predetermined phase difference to be added to the phase of the linear-polarized light, which enters the liquid crystal layer 23. That is, the linear-polarized light is converted to a linear-polarized light whose polarization direction is changed by 90 degrees from the polarization direction in which the linear-polarized light enters the liquid crystal layer 23, and emits from the liquid crystal layer 23. Because this linear-polarized light travels parallel to the transmissive axis of the polarization sheet 25, after the linear-polarized light travels though the polarization sheet 25, it can be visible as displayed light to display light in the sub-pixel regions.

Data signals supplied from the outside of the liquid crystal display device 1 to the driving circuit 15 are input to the data-signal-correction circuit 18. The data signals are corrected by the data-signal-correction circuit 18 to generate new data signals, and these new data signals are output to the data-line-driving circuit 16.

Figure 5:
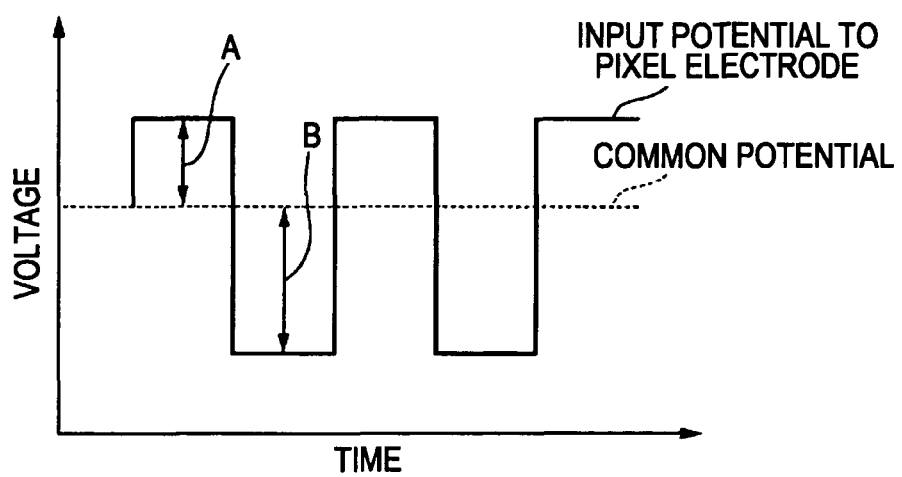
FIG. 5 is a graph showing signal potentials input from a data-signal-correction circuit.
Figure 6:
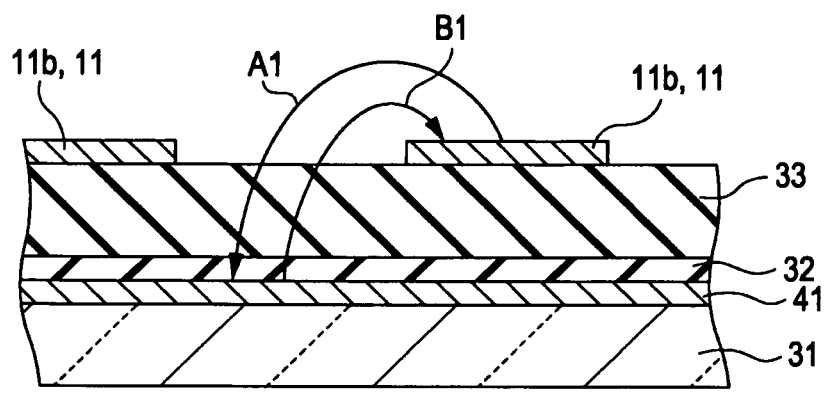
FIG. 6 is an illustration showing the direction of electric fields generated between a pixel electrode and a common electrode.

A method for shifting data signals by the data-signal-correction circuit 18 will be specifically described below. As described above, alternating current signals (signals the polarity of which is inversed between positive polarity and negative polarity) are input in the pixel electrodes 11, and the common potential is input to the common electrodes 41. FIG. 5 is a graph showing the signal potentials input to the pixel electrodes 11 and the common electrodes 41 as the same gray-scale level. FIG. 6 is an illustration showing the conditions of electric fields generated between one of the pixel electrodes 11 and a corresponding one of the common electrodes 41.

As shown in FIG. 5, when the same gray-scale level is set, the data-signal-correction circuit 18 shifts (corrects) a signal potential input to the pixel electrodes 11 such that the potential differences between the common electrodes 41 and the pixel electrodes 11 in the case where the signal potential input to the common electrodes 41 is higher than the signal potential input to the pixel electrodes 11 are larger than the potential differences between the common electrodes 41 and the pixel electrodes 11 in the case where the signal potential input to the common electrodes 41 is lower than the signal potential input to the pixel electrodes 11.

When the signal potential input to the common electrodes 41 is higher than the signal potential input to the pixel electrodes 11, as denoted by B in FIG. 5, a signal potential with negative polarity is input to the pixel electrodes 11. In this case, an upward electric field B1, as shown in FIG. 6, from one of the lower electrodes (common electrodes 41) to a corresponding one of the upper electrodes (pixel electrodes 11) is generated.

In contrast, when the signal potential input to the common electrodes 41 is lower than the signal potential input to the pixel electrodes 11, as denoted by A in FIG. 5, a signal potential with positive polarity is input to the pixel electrodes 11. In this case, a downward electric field A1, as shown in FIG. 6, from the upper electrode (pixel electrode 11) to the lower electrode (common electrode 41) is generated.

The potential difference between the pixel electrode 11 and the common electrode 41 is defined by the difference between the signal potential input to the pixel electrode 11 and the signal potential input to the common electrode 41. In the embodiment, as shown in FIG. 5, the data potential to be input to the pixel electrode 11 is shifted by the data-signal-correction circuit 18. That is, in the liquid crystal display device 1 according to the embodiment, because the potential difference between the pixel electrode 11 and the common electrode 41 generating the upward electric field B1 is larger than the potential difference between the pixel electrode 11 and the common electrode 41 generating the downward electric field A1, the upward electric field B1 is more intensified than the downward electric field A1. This enables the accumulation of electric charges, which is distinctive in the FFS mode configuration, to be suppressed. Accordingly, the image sticking in the liquid crystal layer 23 due to the accumulation of electric charges can be prevented.

Figure 7:
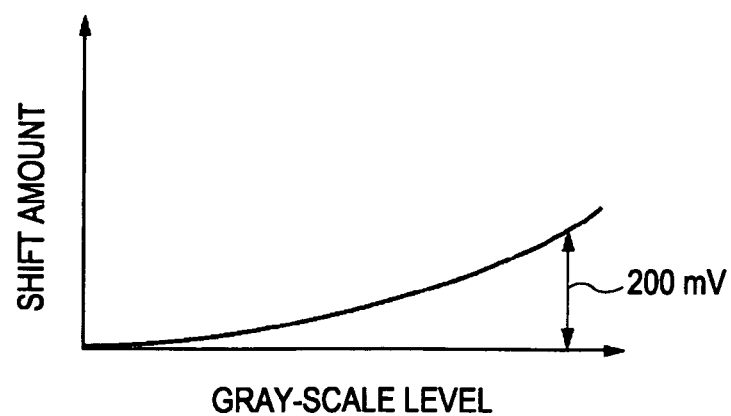
FIG. 7 is a graph showing the relationship gray-scale levels to the shift amounts of the signal potentials.

The amount of remaining electric charges and the shift amount of the common potential are increased as the voltages applied to the pixel electrodes 11 and the common electrodes 41 are increased. In the embodiment, as shown in FIG. 7, the signal potential input to the pixel electrodes 11 is shifted over the entire range of gray-scale levels. In this case, the shift amount of the signal potential is gradually increased on the basis of the increase of a gray-scale level. In FIG. 7, the horizontal axis represents gray-scale levels, and the vertical axis represents shift amounts, which are shifted by the data-signal-correction circuit 18, corresponding to the gray-scale levels. As an example of the shift amounts around a value a corresponding to the maximum gray-scale level (80% to 100% of the white luminance), the signal potential with negative polarity (refer to B in FIG. 5), which is input to the pixel electrodes 11, is preferably increased by approximately 200 mV, compared with the signal potential with positive polarity (refer to A in FIG. 5), which is input to the pixel electrodes 11. Since the shift amount of the signal potential is gradually increased on the basis of the increase of the gray-scale level causing the increase of the amount of electric charges to be accumulated, the accumulation of electric charges can be suppressed over the entire range of gray-scale levels, resulting in the prevention of the image sticking in the liquid crystal layer 23.

As described above, in the liquid crystal display device 1 and the method for driving the liquid crystal display device 1 according to the embodiment, the electric fields from the common electrodes 41 to the pixel electrodes 11 can be more intensified than the electric fields from the pixel electrodes 11 to the common electrodes 41. This enables the accumulation of electric charges, which is distinctive in the FFS mode configuration, to be suppressed, resulting in the prevention of the image sticking in the liquid crystal layer 23. Furthermore, since the accumulation of electric charges and the image sticking in the liquid crystal layer 23 can be prevented over the entire range of gray-scale levels, the display quality of the liquid crystal display device 1 can be improved, and the performance of the liquid crystal display device 1 can be improved.

The range in which the signal potential is shifted by the data-signal-correction circuit 18 is not limited to the above-described range in the embodiment. For example, in the embodiment, although the signal potential is shifted over the entire range of gray-scale levels, the signal potential can be shifted only around a value corresponding to the maximum gray-scale level (80% to 100% of the white luminance). Since the signal potential is shifted only around the value corresponding to the maximum gray-scale level, the increase of power consumption due to the shifting of the signal potential can be suppressed, and the accumulation of electric charges in the case where the maximum gray-scale level is set, which more easily cause the image sticking, can be reliably suppressed.

Additionally, although the data-signal-correction circuit 18 shifts the signal potential input to the pixel electrodes 11 in the embodiment, the data-signal-correction circuit 18 may shift the common potential input to the common electrodes 41 or both of the signal potential and the common potential.

Electronic Apparatus

Figure 8:
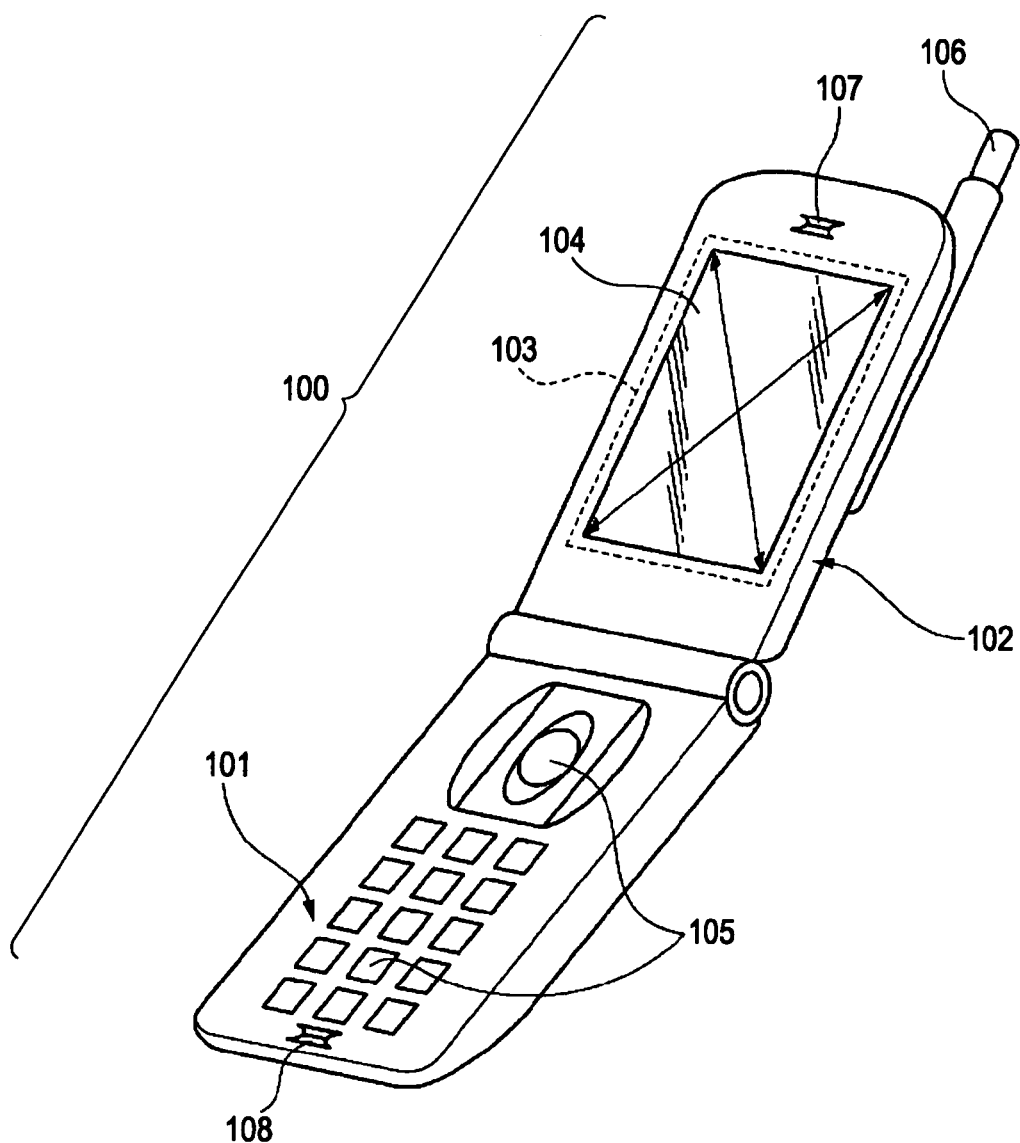
FIG. 8 is a diagram showing a schematic configuration of a mobile phone as an electric apparatus according to an embodiment.

Next, an electronic apparatus having the liquid crystal display device 1 with the above-described configuration will be described. This embodiment is only one example of the invention, and the invention is not limited to this embodiment. FIG. 8 is an exterior perspective view of a mobile phone that is an electronic apparatus having the liquid crystal display device 1 according to the embodiment of the invention. The electronic apparatus according to the embodiment is a mobile phone 100 shown in FIG. 8. The mobile phone 100 includes a main body 101 and a display unit 102 provided thereon so as to be capable of opening and closing. A display device 103 is disposed in the display unit 102, and various indications related to telephone communication can be visible on a display screen 104. Operating buttons 105 are arranged on the main body 101.

An antenna 106 is retractably mounted at one end of the display unit 102. A speaker (not shown) is built into a receiving unit 107 provided on the top of the display unit 102. Furthermore, a microphone (not shown) is built into a mouthpiece 108 provided on the bottom end of the main body 101.

The liquid crystal display device 1 shown in FIG. 1 is used in the display device 103.

Since the mobile phone 100 according to the embodiment includes the liquid crystal display device 1, which can prevent the above-described image sticking, used in the display unit 102, the display quality of the electronic apparatus can be improved, and the performance of the electronic apparatus can be improved.

The invention is not limited to this embodiment, and various modifications can be made without departing from the spirit and the scope of the invention.

Although the TFT elements are used as driving elements that control switching operation of the pixel electrodes in the liquid crystal display device 1 according to the embodiment, the driving elements are not limited thereto. Other driving elements, such as thin film diode elements (TFD), may be used. Additionally, although the liquid crystal display device 1 is a transmissive display device, the liquid crystal display device 1 may be a transflective or reflective liquid display device.

Furthermore, although the liquid crystal display device 1 is a color liquid crystal display device having the three colors, namely R, G, and B, the liquid crystal display device 1 may be a unicolor display device having one color among from R, G, and B or another color, or a display device having two colors, or four colors or more. The color filter layers may be disposed on the element substrate instead of being disposed on the counter substrate.

The electronic apparatus having the liquid crystal display device is not limited to a mobile phone. The electronic apparatus may be other electronic apparatus, such as a personal computer, a notebook personal computer, a workstation, a digital still camera, a vehicle-mounted monitor, a car navigation system, a headup display, a digital video camera, a television set, a view finder type or a monitor type video tape recorder, a pager, a digital diary, a calculator, an electronic book, a projector, a word processor, a videophone, a point-of-sales (POS) terminal, or an apparatus provided with a touch panel.

What is claimed is:

1. An electro-optic device comprising:
    a first substrate;
    a second substrate;
    an electro-optic layer, wherein the first substrate and the second substrate sandwich the electro-optic layer;
    a common electrode;
    a pixel electrode, the common electrode and the pixel electrode being disposed on one of the first substrate and the second substrate, the common electrode being used to drive the electro-optic layer, the pixel electrode being disposed closer to the electro-optic layer than the first electrode, wherein a constant first signal potential is input to the common electrode and a second signal potential is input to the pixel electrode, and wherein according to an alternating current drive signal applied to the electro-optic layer, in a first period the second signal potential applied to the pixel electrode is higher than the first signal potential applied to the common electrode, and in a second period the second signal potential applied to the pixel electrode is lower than the first signal potential applied to the common electrode, the first signal potential remaining constant throughout the first and second periods; and
    an insulating film formed between the common electrode and the pixel electrode, the pixel electrode being formed between the electro-optic layer and the insulating film, wherein:
    (a) in the second period when the first signal potential is higher than the second signal potential:
        (i) the common electrode and the pixel electrode have a first potential difference (B); and
        (ii) the electro-optic device has a first gray-scale defined by a first white luminance;
    (b) in the first period when the first signal potential is lower than the second signal potential:
        (i) the common electrode and the pixel electrode have a second potential difference (A); and
        (ii) the electro-optic device has a second gray-scale defined by a second white luminance; and
    a control unit configured to shift the second signal potential such that the first potential difference (B) is larger than the second potential difference (A) when the first gray-scale is equivalent to the second gray-scale,
    wherein the control unit is further configured to gradually increase a shift amount ($\Delta V = B - A$) of the one of the first signal potential and the second signal potential based on an increase of the gray-scale level to suppress an image sticking in the electro-optic layer.

2. The electro-optic device of claim 1, wherein the control unit is configured to shift the second signal potential over an entire range of a plurality of gray-scale levels.

3. The electro-optic device of claim 1, wherein the control unit is configured to shift the second signal potential around a value corresponding to a maximum gray-scale level.

4. A method of operating an electro-optic device including: (a) a first substrate; (b) a second substrate; (c) an electro-optic layer, wherein the first substrate and the second substrate sandwich the electro-optic layer, (d) a common electrode; and (e) a pixel electrode, the common electrode and the pixel electrode being disposed on one of the first substrate and the second substrate, the common electrode being used to drive the electro-optic layer, the pixel electrode being disposed closer to the electro-optic layer than the common electrode, wherein a constant first signal potential is input to the common electrode and a second signal potential is input to the pixel electrode, and wherein according to an alternating current drive signal applied to the electro-optic layer, in a first period the second signal potential applied to the pixel electrode is higher than the first signal potential applied to the common electrode, and in a second period the second signal potential applied to the pixel electrode is lower than the first signal potential applied to the common electrode, the first signal potential remaining constant throughout the first and second periods; and an insulating film formed between the common electrode and the pixel electrode, the pixel electrode being formed between the electro-optic layer and the insulating film, wherein: (a) in the second period when the first signal potential is higher than the second signal potential: (i) the common electrode and the pixel electrode have a first potential difference (B); and (ii) the electro-optic device has a first gray-scale defined by a first white luminance; (b) in the first period when the first signal potential is lower than the second signal potential: (i) the common electrode and the pixel electrode have a second potential difference (A); and (ii) the electro-optic device has a second gray-scale defined by a second white luminance, the method comprising:

causing a control unit to shift the second signal potential such that the first potential difference (B) is larger than the second potential difference (A) when the first gray-scale is equivalent to the second gray-scale, wherein the control unit is configured to gradually increase a shift amount ($\Delta V=B-A$) of the second signal potential based on an increase of the gray-scale level to suppress an image sticking in the electro-optic layer.

5. The method of claim 4, which includes causing the control unit to shift the second signal potential over an entire range of a plurality of gray-scale levels.

6. The method of claim 4, which includes causing the control unit to shift the second signal potential around a value corresponding to a maximum gray-scale level.

7. An electronic apparatus comprising:
a first substrate;
a second substrate;
an electro-optic layer, wherein the first substrate and the second substrate sandwich the electro-optic layer;
a common electrode;
a pixel electrode, the common electrode and the pixel electrode being disposed on one of the first substrate and the second substrate, the common electrode being used to drive the electro-optic layer, the pixel electrode being disposed closer to the electro-optic layer than the common electrode, wherein a constant first signal potential is input to the common electrode and a second signal potential is input to the pixel electrode, and wherein according to an alternating current drive signal applied to the electro-optic layer, in a first period the second signal potential applied to the pixel electrode is higher than the first signal potential applied to the common electrode, and in a second period the second signal potential applied to the pixel electrode is lower than the first signal potential applied to the common electrode, the first signal potential remaining constant throughout the first and second periods; and
an insulating film formed between the common electrode and the pixel electrode, the pixel electrode being formed between the electro-optic layer and the insulating film, wherein:
(a) in the second period when the first signal potential is higher than the second signal potential:
(i) the common electrode and the pixel electrode have a first potential difference (B); and
(ii) the electro-optic device has a first gray-scale defined by a first white luminance;
(b) in the first period when the first signal potential is lower than the second signal potential:
(i) the common electrode and the pixel electrode have a second potential difference (A); and
(ii) the electro-optic device has a second gray-scale defined by a second white luminance; and
a control unit configured to shift the second signal potential such that the first potential difference (B) is larger than the second potential difference (A) when the first gray-scale is equivalent to the second gray-scale, wherein the control unit is further configured to gradually increase a shift amount ($\Delta V=B-A$) of the second signal potential based on an increase of the gray-scale level to suppress an image sticking in the electro-optic layer.

8. The electronic apparatus of claim 7, wherein the control unit is configured to shift the second signal potential over an entire range of a plurality of gray-scale levels.

9. The electronic apparatus of claim 7, wherein the control unit is configured to shift the second signal potential around a value corresponding to a maximum gray-scale level.

* * * * *